(12) United States Patent
Nagao et al.

(10) Patent No.: US 8,844,995 B2
(45) Date of Patent: Sep. 30, 2014

(54) TONNEAU COVER DEVICE

(75) Inventors: Takashi Nagao, Aichi (JP); Hiroyuki Mori, Nagoya (JP); Toshihiko Nakano, Nagoya (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 14/003,101

(22) PCT Filed: Mar. 23, 2012

(86) PCT No.: PCT/JP2012/002027
§ 371 (c)(1),
(2), (4) Date: Sep. 4, 2013

(87) PCT Pub. No.: WO2012/132367
PCT Pub. Date: Oct. 4, 2012

(65) Prior Publication Data
US 2014/0008933 A1    Jan. 9, 2014

(30) Foreign Application Priority Data
Mar. 30, 2011 (JP) ................. 2011-075519

(51) Int. Cl.
*B60N 3/00* (2006.01)
*B60R 5/04* (2006.01)

(52) U.S. Cl.
CPC ............... *B60R 5/044* (2013.01); *B60R 5/047* (2013.01)
USPC ..................... 296/24.4; 296/37.16

(58) Field of Classification Search
USPC .............. 296/24.4, 37.16, 98, 37.8
See application file for complete search history.

(56) References Cited

U.S. PATENT DOCUMENTS 7,621,577 B2 *  11/2009  Schlecht .......... 296/24.4

FOREIGN PATENT DOCUMENTS

| EP | 1400385 | 3/2004 |
| FR | 2893881 | 6/2007 |
| JP | 2010-12983 | 1/2010 |
| JP | 2010-012984 | 1/2010 |
| JP | 2011-42206 | 3/2011 |
| WO | 2007/059943 | 5/2007 |

OTHER PUBLICATIONS

U.S. Appl. No. 14/006,779 to Shinichi Miyazaki et al., which was filed Sep. 23, 2013.
U.S. Appl. No. 14/006,800 to Takashi Nagao et al., which was filed Sep. 23, 2013.

(Continued)

*Primary Examiner* — Joseph D Pape
(74) *Attorney, Agent, or Firm* — Greenblum & Bernstein, P.L.C.

(57) ABSTRACT

A tonneau cover device includes a tonneau cover coupled to a hatchback door. A movable guide arranged on the tonneau cover is guided by a fixed guide arranged in the vehicle to guide the tonneau cover. The movable guide is separated from the fixed guide when the hatchback door opens. A controller moves the tonneau cover to an extension position when the hatchback door closes and a storage position when the hatchback door opens. A detector detects whether movement of the tonneau cover is obstructed due to contact with an object. The controller temporarily interrupts movement of the tonneau cover when the detector detects that the movement of the tonneau cover to the storage position has been obstructed and restarts the movement of the tonneau cover to the storage position when determining that the movable guide has been separated from the fixed guide as the hatchback door opens.

11 Claims, 2 Drawing Sheets

Fig. 4

(56) References Cited

OTHER PUBLICATIONS

U.S. Appl. No. 14/004,026 to Takashi Nagao et al., which was filed Sep. 9, 2013.

International Search Report dated Jun. 21, 2012.

Japan Office action, mail date is May 20, 2014.

* cited by examiner

TONNEAU COVER DEVICE

TECHNICAL FIELD

The present invention relates to a tonneau cover device.

BACKGROUND ART

Tonneau cover devices are used in vehicles to conceal cargo in cargo compartments and thereby improve security. Japanese Laid-Open Patent Publication No. 2010-12984 describes a tonneau device that moves a tonneau cover with an electric motor.

CITATION LIST

Patent Literature

[PTL 1]
Japanese Laid-Open Patent Publication No. 2010-12984

SUMMARY OF INVENTION

A referential example of a tonneau cover device will now be described with reference to FIG. 3. The tonneau cover device includes a tonneau cover body 40, which is arranged in the inner side of a hatchback door 45. The tonneau cover body 40 includes a tonneau cover 42, a roller 43, a case 46, and a motor 41.

The roller 43 is rod-shaped. The roller 43 is supported to be rotatable about its axis by the case 46. The tonneau cover 42 has a basal end fixed to the circumferential surface of the roller 43. The motor 41 drives a telescopic or expandable link mechanism 49 that rolls the tonneau cover 42 out of or into the case 46. The roller 43 is rotated in a forward direction or reverse direction in accordance with the movement direction of the tonneau cover 42.

Referring to FIG. 4, the link mechanism 49 is arranged under the tonneau cover 42. The link mechanism 49 is extended and retracted by the motor 41. The tonneau cover 42 includes a distal end fixed to the link mechanism 49. The link mechanism 49 applies tension to the tonneau cover 42 in cooperation with a spring (not shown) incorporated in the roller 43. The link mechanism includes movable guides 49a, which project sideward from opposite sides of the distal end of the tonneau cover 42.

Two fixed guides 48 are arranged in the cargo compartment of a vehicle and extend in the front to rear direction of the vehicle. The two fixed guides 48 face each other in the widthwise direction of the vehicle. When the motor 41 is driven in a state in which the hatchback door 45 is closed, the movable guides 49a and the tonneau cover 42 move along the fixed guides 48 in accordance with the extension or retraction of the link mechanism 49.

The distal end of the tonneau cover 42 moves between a storage position and an extension position. When in the storage position, the tonneau cover 42 is rolled up around the roller 43 and stored in the case 46. When the distal end is in the extension position, the tonneau cover 42 is completely rolled out from the roller 43. In this state, the distal end of the tonneau cover 42 is arranged in the vicinity of the rear surface of a rear seat. Thus, when the distal end of the tonneau cover 42 is located at the extension position, the tonneau cover 42 conceals cargo that is placed in the cargo compartment under the tonneau cover 42.

The tonneau cover 42 moves in cooperation with the opening and closing of the hatchback door 45. More specifically, the tonneau cover 42 moves from the storage position to the extension position when the hatchback door 45 closes. Further, the tonneau cover 42 moves from the extension position to the storage position when the hatchback door 45 opens.

In the tonneau cover device of the referential example, as the tonneau cover 42 moves to the storage position, the tonneau cover 42 or the link mechanism 49 may come into contact with an object in the cargo compartment. This may obstruct movement of the tonneau cover 42 to the storage position. The inventors of the present invention have studied how to control and drive the tonneau cover 42 when the tonneau cover 42 or the link mechanism 49 comes into contact with an object. When such obstruction is detected during movement of the tonneau cover 42 to the storage position, the tonneau cover 42 is automatically pulled out by a length (several centimeters) that is sufficient for resolving contact of the tonneau cover 42 or link mechanism 49 with the object. Then, the movement of the tonneau cover 42 is stopped at the pulled-out position where there is no contact with the object.

However, the tonneau cover 42 stops moving and remains at a midway position. Thus, as shown by the broken lines in FIG. 3, the movable guides 49a would be greatly separated from the fixed guides 48 when the hatchback door 45 is open. In this case, when closing the hatchback door 45, the user would have to place the movable guides 49a on the fixed guides 48 while holding the hatchback door 45 in a partially closed state. This is a burdensome task. When this task is not performed, the tonneau cover 42 or the link mechanism 49 would be interfered by the vehicle body or an object in the cargo compartment when closing the hatchback door 45. In such a case, the hatchback door 45 cannot be completely closed. Further, even if the hatchback door 45 can be closed, the movable guides 49a may not be held on the fixed guides 48. In such a case, the tonneau cover 42 may not be movable in the horizontal direction.

It is an object of the present invention to provide a tonneau cover that improves convenience.

One aspect of the present invention is a tonneau cover device including a tonneau cover having a basal end, which is coupled to an inner side of a hatchback door, and an opposite distal end. A movable guide is arranged on the tonneau cover. The movable guide is guided by a fixed guide, which is arranged in the vehicle to guide the tonneau cover in a horizontal direction of the vehicle. The movable guide is separated from the fixed guide when the hatchback door opens. A controller moves the tonneau cover to an extension position when the hatchback door closes and a storage position when the hatchback door opens. The distal end of the tonneau cover is farthest from the basal end at the extension position, and the distal end of the tonneau cover is closest to the basal end at the storage position. A detector detects whether movement of the tonneau cover is obstructed due to contact with an object. The controller temporarily interrupts movement of the tonneau cover when the detector detects that the movement of the tonneau cover to the storage position has been obstructed. The controller restarts the movement of the tonneau cover to the storage position when determining during the interruption that the movable guide has been separated from the fixed guide as the hatchback door opens.

A further aspect of the present invention is a tonneau cover device including a tonneau cover having a basal end, which is coupled to an inner side of a hatchback door, and an opposite distal end. A movable guide is arranged on the tonneau cover. The movable guide is guided by a fixed guide, which is arranged in the vehicle to guide the tonneau cover in a horizontal direction of the vehicle, and the movable guide is separated from the fixed guide when the hatchback door opens. A drive source moves the tonneau cover, when the hatchback door opens, from an extension position, at which the distal end of the tonneau cover is farthest from the basal end, to a storage position, at which the distal end of the tonneau cover is closest to the basal end. A tonneau cover control unit monitors the location and movement of the tonneau cover and controls the drive source. The tonneau cover control unit holds a determination reference time. When movement of the tonneau cover to the storage position is obstructed, the tonneau cover control unit interrupts the driving of the drive source for a interruption control period based on the determination reference time. After the interruption control period ends, the tonneau cover control unit restarts the driving of the drive source and moves the tonneau cover to the storage position. The interruption control period corresponds to time that is sufficient for the movable guide to be separated from the fixed guide when the hatchback door opens.

Other aspects and advantages of the present invention will become apparent from the following description, taken in conjunction with the accompanying drawings, illustrating by way of example the principles of the invention.

DESCRIPTION OF EMBODIMENTS

Figure 1:
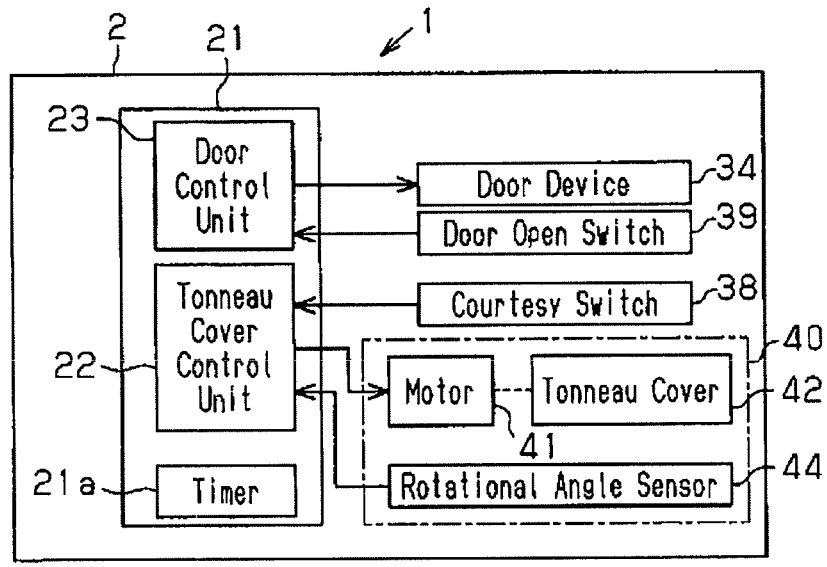
FIG. 1 is a block diagram of a vehicle and a tonneau cover device.

A tonneau cover device 1 according to one embodiment of the present invention will now be described with reference to FIGS. 1 to 4.

An in-vehicle controller 21, which is formed by a computer, includes a tonneau cover control unit 22 and a door control unit 23. The tonneau cover control unit 22 is electrically connected to a courtesy switch 38 and a tonneau cover body 40. The courtesy switch 38 detects the opening and closing of a hinged hatchback door 45 that opens upward. More specifically, the courtesy switch 38 detects when the hatchback door 45 is completely closed and when the hatchback door 45 opens from the completely closed state.

The door control unit 23 is connected to a door open switch 39 and a door device 34. The door open switch 39 is arranged on an outer side of the hatchback door 45. The door open switch 39, when pushed, sends an operation signal to the door control unit 23.

When the door open switch 39 is operated in a state in which the hatchback door 45 is unlocked, the in-vehicle controller 21 controls the door device 34 and shifts the hatchback door 45 to a state in which it can be opened. For example, the door device 34 removes a latch from the hatchback door 45.

The in-vehicle controller 21 includes a timer 21a.

Figure 3:
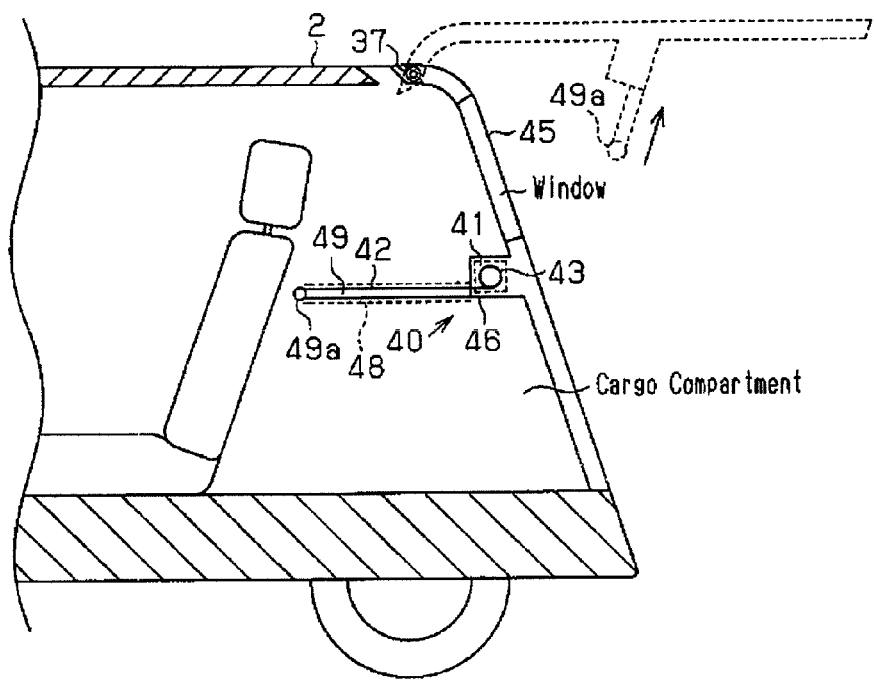
FIG. 3 is a cross-sectional view of a tonneau cover device in a referential example.
Figure 4:
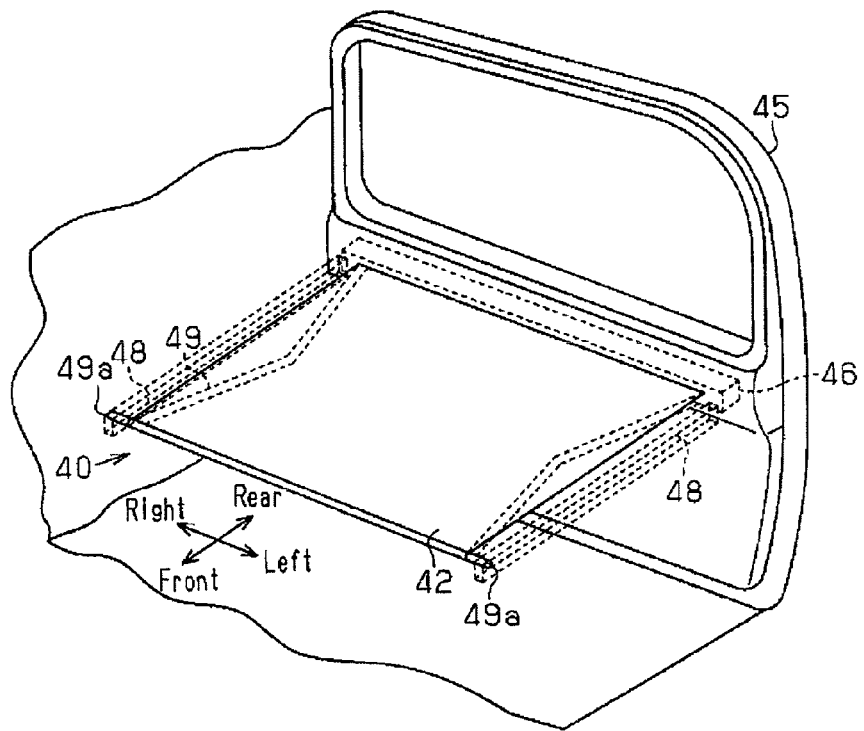
FIG. 4 is a perspective view showing the tonneau cover device of FIG. 3.

The tonneau cover body 40 has the same structure as that of the referential example shown in FIGS. 3 and 4. Thus, the tonneau cover body 40 will not be described. The tonneau cover device 1 is formed by a controller, such as the tonneau cover control unit 22, and the tonneau cover body 40.

When the tonneau cover control unit 22 determines that the hatchback door 45 has reached a completely closed position based on a signal from the courtesy switch 38, the tonneau cover control unit 22 drives the motor 41 and moves the distal end of the tonneau cover 42 from the storage position to the extension position. When the tonneau cover control unit 22 determines that the hatchback door 45 is starting to open based on a signal from the courtesy switch 38, the tonneau cover control unit 22 drives the motor 41 and moves the distal end of the tonneau cover 42 from the extension position to the storage position.

The tonneau cover body 40 may include a rotational angle sensor 44, which is formed by, for example, a rotary encoder. The rotational angle sensor 44 detects a rotational angle of the roller 43 and outputs a signal that is in accordance with the detected angle. The rotational angle sensor 44 is one example of a tonneau cover sensor that detects the position and movement of the tonneau cover 42. The tonneau cover control unit 22 monitors the location and movement of the tonneau cover 42 based on a signal from the rotational angle sensor 44.

When the motor 41 is being driven and the signal from the rotational angle sensor 44 indicates that the roller 43 is not rotating, the tonneau cover control unit 22 determines that movement of the tonneau cover 42 is being obstructed due to contact of the tonneau cover 42 or the link mechanism 49 with an object. The rotational angle sensor 44 and the tonneau cover control unit 22 form a detector that detects that movement of the tonneau cover 42 is obstructed.

As the hatchback door 45 opens and the tonneau cover 42 moves from the extension position to the storage position, the movement of the tonneau cover 42 may be obstructed. When such an obstruction is detected, the tonneau cover control unit 22 temporarily stops driving the motor 41. Then, the tonneau cover control unit 22 waits until a determination reference time T elapses from when the hatchback door 45 starts to open. The tonneau cover control unit 22 starts driving the motor 41 again when the determination reference period T elapses and moves the tonneau cover 42 to the storage position. The tonneau cover control unit 22 uses the timer 21a to measure or obtain the elapsed time from when the hatchback door 45 starts to open.

The determination reference period T may be stored beforehand in, for example, the tonneau cover control unit 22. In one example, the determination reference time T is set based on the time required for the hatchback door 45 to fully open from when it starts to open. For example, an opening time required for the hatchback door 45 to fully open from a completely closed state is obtained through simulations or measurements taken by repetitively opening the hatchback door 45. This opening time may be set as the determination reference time T. Alternatively, the opening time may be calculated from the average opening speed of the hatchback door 45 when the hatchback door 45 moves from a completely closed position to a fully open position and the movement distance of the hatchback door 45 from the completely closed position to the fully open position. This opening time may be set as the determination reference time T.

When the determination reference period T elapses, it can be estimated that the hatchback door 45 is located at the fully open position as shown by the broken lines in FIG. 3. When the hatchback door 45 is fully open, the tonneau cover 42 does not interfere with the vehicle body or with an object in the cargo compartment. Further, the movable guides 49a are separated from the fixed guides 48, and the tonneau cover 42 is suspended from the hatchback door 45. Thus, the tonneau cover 42 can be moved to the storage position. After the tonneau cover 42 is stored, the user can close the hatchback door 45. When the hatchback door 45 is closed, the movable guides 49a cooperate with the fixed guides 48 so that the tonneau cover 42 is movable along the fixed guides 48.

As long as the tonneau cover control unit 22 detects no obstructions during movement of the tonneau cover 42 from the extension position to the storage position when the hatchback door 45 is opening, the tonneau cover 42 will reach the storage position when the hatchback door 45 fully opens. When the hatchback door 45 is closed from this state, the tonneau cover control unit 22 moves the tonneau cover 42 from the storage position to the extension position. Accordingly, when the hatchback door 45 is fully closed, the tonneau cover 42 conceals cargo arranged under the tonneau cover 42. When the tonneau cover control unit 22 detects an obstruction during movement of the tonneau cover 42 toward the extension position, the tonneau cover control unit 22 reverses the movement direction of the tonneau cover 42 and moves the tonneau cover 42 toward the storage position by a length that is sufficient for resolving contact with the object that caused the obstruction. The tonneau cover 42 is then stopped at this position. This avoids a state in which the contact of the tonneau cover 42 with the object applies excessive load to the tonneau cover 42 and object.

The processing performed by the tonneau cover control unit 22 when the hatchback door 45 opens will now be described with reference to the flowchart of FIG. 2.

Figure 2:
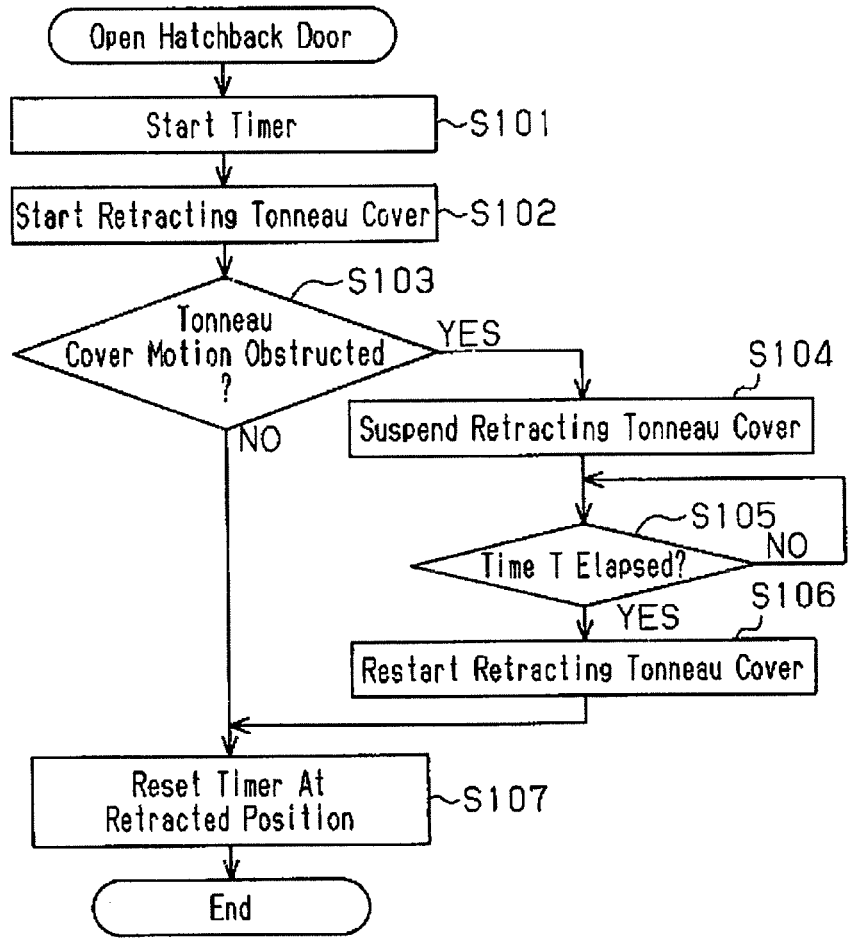
FIG. 2 is a flowchart showing the processing performed by a tonneau cover control unit when a hatchback door opens.

The processing shown in FIG. 2 starts when the tonneau cover control unit 22 determines that the hatchback door 45 has started to open from a signal received from the courtesy switch 38.

The tonneau cover control unit 22 starts measuring the elapsed time from when the hatchback door 45 starts to open with the timer 21a (S101). Then, the tonneau cover control unit 22 starts to drive the motor 41 to move the tonneau cover 42 to the storage position (S102). During the movement, the tonneau cover control unit 22 monitors the tonneau cover 42 for an obstruction (S103). When an obstruction in the movement of the tonneau cover 42 is detected (YES in S103), the tonneau cover control unit 22 temporarily stops driving the motor 41. This stops moving the tonneau cover 42 with the motor 41 (S104).

The tonneau cover control unit 22 waits until the measured elapsed time reaches the determination reference period T (NO in S105). During the waiting period, the hatchback door 45 becomes fully open. When the measured elapsed time reaches the determination reference period T (YES in S105), the motor 41 is driven again to move the tonneau cover 42 to the storage position (S106). After determining that the tonneau cover 42 has reached the storage position, the tonneau cover control unit 22 resets the timer 21a (S107). The period from when the driving of the motor 41 is temporarily interrupted to when the driving of the motor 41 is restarted may be referred to as an interruption control period.

When an obstruction is not detected during movement of the tonneau cover 42 (NO in S103), the tonneau cover control unit 22 continues to drive the motor 41 until determining that the tonneau cover 42 has reached the storage position. After the tonneau cover 42 reaches the storage position, the tonneau cover control unit 22 resets the timer 21a (S107).

The present embodiment has the advantages described below.

(1) When movement of the tonneau cover 42 to the storage position with the motor 41 is obstructed, the tonneau cover control unit 22 temporarily interrupts the movement. The tonneau cover control unit 22 restarts the movement to the storage position after a certain time, i.e., the reference period T, elapses. When the certain time elapses, the hatchback door 45 has reached the fully open position in which the tonneau cover 42 and the link mechanism 49 do not interfere with the vehicle body or an object in the cargo compartment. This allows the user to close the hatchback door 45 more smoothly than the referential example in which an obstruction during the storage of the tonneau cover 42 completely stopped and movement of the tonneau cover 42 to the storage position is not restarted. Accordingly, convenience is improved.

(2) The tonneau cover control unit 22 restarts the movement of the tonneau cover 42 to the storage position after the determination reference time T elapses from when the hatchback door 45 starts to open. The measurement of the elapsed time is simple, and the storage control of the tonneau cover 42 is simple.

It should be apparent to those skilled in the art that the present invention may be embodied in many other specific forms without departing from the spirit or scope of the invention. Particularly, it should be understood that the present invention may be embodied in the following forms.

The timing for restarting the storage of the tonneau cover 42 is not limited to after the period required for the hatchback door 45 to fully open ends as long as the movable guides 49a are separated from the fixed guides 48. Accordingly, the determination reference time T is not limited to the time required for the hatchback door 45 to fully open. For example, the determination reference time T may be the time from when the hatchback door 45 starts to open that is required for the movable guides 49a to be separated from the fixed guides 48. In this case, by restarting the driving of the motor 41 after the movable guides 49a are separated from the fixed guides 48, the tonneau cover 42 can be properly stored at the storage position.

The cover device 1 may include a sensor that detects whether or not the movable guides 49a are located on the fixed guides 48. When detecting that movement of the tonneau cover 42 has been obstructed during storage of the tonneau cover 42, the tonneau cover control unit 22 temporarily interrupts the driving of the motor 41. Then, when determining from the detection result of the sensor that the movable guides 49a have been separated from the fixed guides 48, the tonneau cover control unit 22 drives the motor 41 again and moves the tonneau cover 42 to the storage position. The sensor may include a plurality of proximity sensors arranged on the fixed guides 48 along a movement path of the movable guides 49a. Such a sensor arrangement allows for accurate determination of the timing in which the movable guides 49a are separated from the fixed guides 48, and the movement of the tonneau cover 42 to the storage position can be restarted with further promptness.

In the above embodiment, the determination reference time T is a fixed value. However, the determination reference time T may be a variable value that varies in accordance with the location of the tonneau cover 42 when an obstruction in the movement of the tonneau cover 42 interrupts the driving of the motor 41. More specifically, when the driving of the motor 41 is interrupted in a state in which the tonneau cover 42 is located near the storage position, the opening amount (movement angle) of the hatchback door 45 required for the movable guides 49a to move to a position where they separate from the fixed guides 48 is relatively small. For such a case, the determination reference time T is set to be relatively short to readily restart the driving of the motor 41. When the driving of the motor 41 is interrupted in a state in which the tonneau cover 42 is located near the extension position, the opening amount of the hatchback door 45 required for the movable guides 49a to move to a position where they are separated from the fixed guides 48 is relatively large. For such a case, the determination reference time T is set to be relatively long. In this manner, by using a variable determination reference time T, the movement of the tonneau cover 42 to the storage position can be restarted with further promptness. The tonneau cover control unit 22 can determine the location of the tonneau cover 42 when its movement is obstructed based on a signal from the rotational angle sensor 44 or the above-described proximity sensors. The tonneau cover control unit 22 can hold in advance variable values corresponding to where movement may be obstructed as the reference determination value T.

Referring to FIG. 3, the tonneau cover device 1 may include a rotational sensor 37 arranged in a hinge of the hatchback door 45. The rotational sensor 37 detects the open amount of the hatchback door 45 and sends the detection result to the tonneau cover control unit 22. Based on where movement of the tonneau cover 42 is obstructed and the open amount of the hatchback door 45, the tonneau cover control unit 22 can determine whether or not the movable guides 49a have been separated from the fixed guides 48. More specifically, based on where movement of the tonneau cover 42 is obstructed, the tonneau cover control unit 22 calculates the opening amount of the hatchback door 45 required to move the movable guides 49a to a position at which they separate from the fixed guides 48 and holds the calculated value as a threshold. When the actual opening amount of the hatchback door 45 detected by the rotational sensor 37 reaches the threshold, the tonneau cover control unit 22 determines that the movable guides 49a have been separated from the fixed guides 48, drives the motor 41 again, and moves the tonneau cover 42 to the storage position. Thus, the tonneau cover control unit 22 can accurately detect the timing at which the movable guides 49a are separated from the fixed guides 48 without being affected by variations in the opening speed of the hatchback door 45. This structure may be combined with the measurement of the elapsed time with the timer 21a. Alternatively, the measurement of the elapsed time with the timer may be omitted.

When restarting the storage of the tonneau cover 42 (S106), the tonneau cover control unit 22 may actuate a buzzer to notify the user that the storage has been restarted. The tonneau cover control unit 22 may also continuously actuate the buzzer during a period from when the tonneau cover 42 starts to move to the storage position to when the tonneau cover 42 reaches the storage position. Instead of or in addition to a buzzer, a lamp such as the hazard flashers may be flashed. This allows for the tonneau cover control unit 22 to notify the user that the storage of the tonneau cover 42 is being restarted in a normal manner.

The tonneau cover control unit 22 may lower the storage speed of the tonneau cover 42 after the restarting operation in step S106 from the normal storage speed in step S102. This allows for the tonneau cover control unit 22 to notify the user that the storage of the tonneau cover 42 is being restarted in a normal manner.

When movement of the tonneau cover 42 is obstructed (YES in S103), the tonneau cover control unit 22 temporarily interrupts the movement of the tonneau cover 42 with the motor 41 (S104). However, in step S104, the tonneau cover control unit 22 may temporarily interrupt the movement of the tonneau cover 42 after moving the tonneau cover 42 toward the extension position by a length that resolves contact with an object. This promptly resolves contact of the tonneau cover 42 or link mechanism 49 with an object.

In the above embodiment, the courtesy switch 38 is a door sensor that detects when the hatchback door 45 starts to open. However, any door sensor other than the courtesy switch 38 can be used as long as the sensor can detect that the hatchback door 45 has started to open. For example, when a door open switch arranged at the outer side of the hatchback door 45 is operated thereby moving a latch (lock) to an unlock position from a lock position, the hatchback door 45 can be opened. In this case, the door sensor may be latch switch that detects whether the latch is located at the unlock position. When the tonneau cover control unit 22 determines with the latch switch that the latch has been moved from the lock position to the unlock position, the tonneau cover control unit 22 determines that the hatchback door 45 is starting to open and moves the tonneau cover 42 from the extension position to the storage position.

The tonneau cover 42 is a soft sheet of a fabric or the like. However, the tonneau cover 42 may be hard and include a plurality of separate plates. In this case, a link mechanism joins the plates. Such a tonneau cover folds and stacks the plates when at the storage position. When spreading out the tonneau cover 42 from the storage position to the extension position, the plates lie along the same plane.

In the above embodiment, the tonneau cover control unit 22 is arranged in the in-vehicle controller 21. However, the tonneau cover control unit 22 may be discrete from the in-vehicle controller 21.

Two or more of the above modifications may be combined.

The present examples and embodiments are to be considered as illustrative and not restrictive, and the invention is not to be limited to the details given herein, but may be modified within the scope and equivalence of the appended claims.

The invention claimed is:

1. A tonneau cover device comprising:
a tonneau cover including a basal end, which is coupled to an inner side of a door at the back of a vehicle, and an opposite distal end;
a movable guide arranged on the tonneau cover, wherein the movable guide is guided by a fixed guide, which is arranged in the vehicle to guide the tonneau cover in a horizontal direction of the vehicle, and the movable guide is separated from the fixed guide when the door opens;
a controller that moves the tonneau cover to an extension position when the door closes and a storage position when the door opens, wherein the distal end of the tonneau cover is farthest from the basal end at the extension position, and the distal end of the tonneau cover is closest to the basal end at the storage position; and
a detector that detects whether movement of the tonneau cover is obstructed due to contact with an object, wherein
the controller temporarily interrupts movement of the tonneau cover when the detector detects that the movement of the tonneau cover to the storage position has been obstructed, and
the controller restarts the movement of the tonneau cover to the storage position when determining during the interruption that the movable guide has been separated from the fixed guide as the door opens.

2. The tonneau cover device according to claim 1, wherein
the controller holds a determination reference time,
the controller measures an elapsed time from when the door start to open,
the controller determines that the movable guide has been separated from the fixed guide when the elapsed time reaches the determination reference time and restarts the interrupted movement of the tonneau cover to the storage position, and
the determination reference time corresponds to a time in which the door moves from a closed position to a fully open position.

3. The tonneau cover device according to claim 1, wherein
the controller holds a determination reference time,
the controller measures an elapsed time from when the movement of the tonneau cover is interrupted,
the controller determines that the movable guide has been separated from the fixed guide when the elapsed time reaches the determination reference time and restarts the interrupted movement of the tonneau cover to the storage position, and
the determination reference time is a variable value that is set to be shorter when the tonneau cover is located closer to the storage position at a point of time in which the movement of the tonneau cover is interrupted.

4. The tonneau cover device according to claim 2, wherein the controller is connected to a courtesy switch that detects that the door has started to open.

5. The tonneau cover device according to claim 1, wherein
the controller is connected to a sensor that detects whether or not the movable guide is held on the fixed guide, and
the controller determines from the detection of the sensor that the movable guide has been separated from the fixed guide.

6. The tonneau cover device according to claim 1, wherein
the controller is connected to a sensor that detects an opening amount of the door, and
the controller determines that the movable guide has been separated from the fixed guide when the opening amount of the door detected by the sensor reaches a threshold.

7. The tonneau cover device according to claim 6, wherein the controller holds the threshold that is set to be shorter when the tonneau cover is located closer to the storage position at a point of time in which the movement of the tonneau cover is interrupted.

8. A tonneau cover device comprising:
a tonneau cover including a basal end, which is coupled to an inner side of a hinged hatchback door of the vehicle that opens upward, and an opposite distal end;
a movable guide arranged on the tonneau cover, wherein the movable guide is guided by a fixed guide, which is arranged in the vehicle to guide the tonneau cover in a horizontal direction of the vehicle, and the movable guide is separated from the fixed guide when the hatchback door opens;
a drive source that moves the tonneau cover, when the hatchback door opens, from an extension position, at which the distal end of the tonneau cover is farthest from the basal end, to a storage position, at which the distal end of the tonneau cover is closest to the basal end; and
a tonneau cover control unit that monitors the location and movement of the tonneau cover and controls the drive source, wherein
the tonneau cover control unit holds a determination reference time;
when movement of the tonneau cover to the storage position is obstructed, the tonneau cover control unit interrupts the driving of the drive source for a interruption control period based on the determination reference time,
after the interruption control period ends, the tonneau cover control unit restarts the driving of the drive source and moves the tonneau cover to the storage position, and
the interruption control period corresponds to time that is sufficient for the movable guide to be separated from the fixed guide when the hatchback door opens.

9. The tonneau cover device according to claim 8, wherein the interruption control period corresponds to time that is required for the hatchback door to move from a completely closed position to a fully open position.

10. The tonneau cover device according to claim 8, wherein the interruption control period corresponds to time that is required for the movable guide to move from a position at which the movement is obstructed to a position at which the movable guide is separated from the fixed guide as the hatchback door opens.

11. The tonneau cover device according to claim 8, wherein the interruption control period corresponds to a movement angle of the hatchback door that is required for the movable guide to move from a position at which the movement is obstructed to a position at which the movable guide is separated from the fixed guide as the hatchback door opens.

* * * * *